US005382473A

United States Patent [19]

Musclow et al.

[11] Patent Number: 5,382,473

[45] Date of Patent: Jan. 17, 1995

[54] MULTILAYER FILM STRUCTURE

[75] Inventors: Gordon L. Musclow, Henrietta; Robert V. Poirier; Ralph J. Weber, both of Fairport, all of N.Y.

[73] Assignee: Mobil Oil Corporation, Fairfax, Va.

[21] Appl. No.: 963,610

[22] Filed: Oct. 20, 1992

[51] Int. Cl.[6] .......................... B23B 7/12; B23B 27/36

[52] U.S. Cl. .................................... 428/353; 428/354; 428/412; 428/414; 428/482; 428/483; 428/516; 428/520

[58] Field of Search ............... 428/412, 414, 353, 354, 428/482, 483, 516, 520

[56] References Cited

U.S. PATENT DOCUMENTS

| | | | |
|---|---|---|---|
| 3,230,175 | 1/1986 | Martens | 252/171 |
| 3,719,629 | 3/1973 | Martin et al. | 260/33.2 |
| 4,525,419 | 6/1985 | Posey et al. | 428/336 |
| 5,066,434 | 11/1991 | Liu et al. | 264/37 |

FOREIGN PATENT DOCUMENTS

| | | |
|---|---|---|
| 62-187092 | 2/1988 | Japan . |
| 766827 | 5/1954 | United Kingdom . |

*Primary Examiner*—P. C. Sluby
*Attorney, Agent, or Firm*—Alexander J. McKillop; Dennis P. Santini; Laurence P. Hobbes

[57] ABSTRACT

A polymeric film substrate having on at least one surface a prime coating of the type which causes destructive film blocking between contacting layers. This prime coating is top coated with pigmented or non-pigment polyester ink base so as to eliminate the blocking. This top coating is a excellent base for printing inks.

4 Claims, No Drawings

MULTILAYER FILM STRUCTURE

BACKGROUND OF THE INVENTION

This invention relates to a multilayer packaging or label stock film having excellent printability and non-blocking characteristics.

The standard commercial approach to achieve wetting and adhesion of printing inks on certain packaging and label stock film is to treat the film either with corona discharge or a gas flame. This type of treatment does not always provide for sufficient ink adhesion for many applications. Excellent adhesion can be obtained by applying a prime layer to the film before application of the ink. While this may provide an excellent surface for wetting and adhering printing inks, preprimed film cannot be sold in roll form to a customer who is in the business of providing subsequent converting steps, because the prime layer will cause destructive blocking between the primed surface and the reverse side of the film after it is rolled up and stored for any length of time.

It is a principal object of the present invention to present a film which has excellent printability.

It is another object of the present invention to present a film which after printing can withstand rigorous surface agitation and high water temperature without adversely affecting the print.

It is still another object of the present invention to present a film not subject to destructive blocking.

SUMMARY OF THE INVENTION

The present invention is concerned with a printable film structure comprising a polymeric film substrate having surfaces incompatible with printing ink adhesion, at least one such surface having a prime coating thereon of the type which causes destructive blocking between contacting layers of such coated films, said prime coating having thereon a printing ink base, with or without pigment, so as to prevent said blocking. The printing ink base is preferably a thin coating of a linear, water-dissipatable polyester having an inherent viscosity of at least about 0.1 as measured in a 60–40 parts by weight solution of phenol/tetrachloroethane at 25° C., and at a concentration of 0.5 gram of polyester in 100 ml of solvent, the polyester containing substantially equimolar proportions of acid moiety repeating units (100 mole %) to hydroxy moiety repeating units (100 mole %), the polyester comprising repeating units of components (a), (b), (c) and (d), as follows, wherein all stated mole percentages are based on the total of all acid and hydroxy moiety repeating units being equal to 200 mole %:

(a) about 90 to about 97 mole % isophthalic acid, (b) about 3 to about 10 mole % 5-sulfoisophthalic acid, (c) about 70 to about 85 mole % 1,4-cyclohexanedimethanol, and (d) about 15 to about 30 mole % diethylene glycol.

In the film structure described above the prime coating can be a coating of a member selected from the group consisting of (A) the reaction product of acidified aminoethylated vinyl polymer and an epoxy resin, (B) poly(ethyleneimine), and (C) mixtures thereof.

DETAILED DESCRIPTION OF THE INVENTION

The substrates contemplated herein include any polymeric film substrate that can be employed for packaging purposes or for a label stock film or for decorative purposes, etc. Included within this class of materials are nylon, polyethyleneterephthalate, polycarbonate, polyolefins, etc. The contemplated structures also include coextrudates of the recited materials, laminates of any two or more of these materials or interblends of any of the materials extruded as a single base film. A particularly preferred class of films are the polyolefins. Within the polyolefin class, homopolymers and copolymers of propylene are preferred. Particularly preferred are isotatic polypropylenes containing at least 80% by weight of isotatic polypropylene. The preferred base substrate layer can be homopolymer polypropylene having a melting point range of from about 321° to about 336° F. Commercially available materials of this description include Exxon 4252 and FINA 3371. When the preferred substrate is employed it can be employed as is or with coextruded or laminated thin skin layers which each amount to about 2–18% of the total thickness. The skin material can be a copolymer of propylene and another olefin, e.g., ethylene, butene-1. The other olefin can be present in the copolymer in an amount of from about 1–7 wt. %. A preferred substrate is polypropylene with or without the same or different skin layers of a member selected from the group consisting of polyethylene, copolymers of ethylene and butene-1, copolymers of propylene and an olefin selected from the group consisting of ethylene and butene-1 terpolymers of olefins, maleic anhydride modified polymers and mixtures thereof. Another preferred substrate is polypropylene interblended with a minor proportion of a member selected from the group consisting of polyethylene, copolymers of ethylene and an alpha olefin, copolymers of propylene and an alpha olefin, terpolymers of olefins, maleic anhydride modified polymers and mixtures thereof. White opaque, cavitated polypropylene is also a substrate film of choice. Polyethylene film is also contemplated as a substrate film.

The films employed can be unaxially or biaxially oriented. The preferred range of orientation can be from 13 to 7 times in the machine direction and from 5 to 10 times in the transverse direction.

Before prime coating any of these materials they may be corona discharge treated to about 38–42 dynes/cm by standard commercial techniques. They may also be flame treated by means well-known in the art.

The prime coating material contemplated, as indicated above, is the type which inherently causes destructive film blocking between contacting layers of such a coated film when the film is convolutely rolled up and store for at least a number of days. As indicated above, the prime coating is a coating of a member selected from the group consisting of: (A) the reaction product of an acidified aminoethylated vinyl polymer and an epoxy resin, (B) poly(ethyleneimine) and (C) any mixtures thereof.

The prime coating (A) is described in U.S. Pat. No. 5,066,434 the disclosure of which is incorporated herein in its entirety by reference.

As disclosed the primer materials include the reaction product of an epoxy resin and an acidified aminoethylated vinyl polymer. The contemplated epoxy resins are glycidyl ethers of polyhydroxy compounds. Typical polyhydroxy compounds which may be used include bisphenol A, ring substituted bisphenol A, resorcinal, hydroquinone, phenol-formaldehyde, novolac resins, aliphatic diols, such as ethylene glycol, propylene glycol, 1,4-butanediol, 1,6-hexanediol, glycerol, lower alkyl hydantoins and mixtures thereof.

The preferred epoxy resins of the present invention are those made by the glycidation reaction between epichlorohydrin and bisphenol A. Epoxy resins of this type are commonly classified by their epoxy equivalent weight (EEW) which is defined as the weight of resin in grams which contains one gram equivalent of epoxy groups. Resins with an EEW ranging from about 170 to about 280 may be used in the present invention, but the preferred range is from about 180 to about 210.

A variation in the composition of the epoxy resin component is one in which a hydantoin compound is substituted for the bisphenol A. For example, 1,1-dimethyl hydantoin may be employed in a low molecular weight epoxy resin since resins based on this material are completely water soluble thereby eliminating the necessity for emulsification.

Although the specific structure of the epoxy resin is not critical to the primer employed in the present invention, important considerations in the selection of the epoxy resin depend upon its physical state. For example, it must be liquid and capable of being readily dispersed or dissolved with the second component or curing agent as described hereinbelow. If the epoxy resin is of low viscosity, it may be stirred directly into the second component, i.e., curing agent, however, it is preferred to employ the epoxy resin in an aqueous emulsion.

The second component in the epoxy primer compositions of the present invention is an amino modified acrylic polymer which is water soluble. This polymer is a curing agent for the epoxy compound. The preferred material is described in the U.S. Pat. No. 3,719,629, the disclosure of which is incorporated herein by reference, and may be generically described as an acidified aminoethylated interpolymer having pendant amino alkylate groups. This material is produced by polymerizing acrylate, methacrylate, styrene or other suitable monomers with sufficient methacrylic or acrylic acid to give a —COOH content of about 7.5 to about 12.5%. Solvent polymerization techniques are preferred. The polymer is then reacted with ethyleneimene monomer and acidified with hydrochloric acid to render the polymer water soluble.

The prime coating may be applied to the substrate as a dispersion or as a solution, from an organic vehicle, for example, an alcohol or an aromatic hydrocarbon, such as xylene or a mixture thereof.

In one embodiment of the present invention, a liquid epoxy resin is emulsified in a solution of the curing agent by rapid stirring. Thereafter, the resultant dispersion is diluted with water to the desired concentration for coating, which typically includes from about 2 to about 25% solids.

When mixing the epoxy resin with the curing agent, it is generally preferred to use a stoichiometric equivalent balance of epoxy and amine groups. However, it has been found that the stoichiometric ratio may be varied over a wide range, for instance, from about one epoxy group to about three amine groups through three epoxy groups to one amine group and, preferably, from about one epoxy group to two amine groups through about two epoxy groups to about one amine group, without seriously affecting the product's usefulness as a primer coating.

It is to be understood that the solution or dispersion of epoxy resin and curing agent can contain small amounts of wetting agents in order to facilitate the application of the prime material to the surface of layer (b). Conventional non-ionic wetting agents which can be employed include the hexyl or benzyl ether of ethylene glycol, the hexyl ether of diethylene glycol, butyl alcohol, hexyl alcohol, octyl alcohol, diacetone alcohol, and the like.

Although mixtures of the epoxy resin and the curing agents will cross-link or cure without the necessary addition of a catalyst, it has been found advantageous, in certain instances, to use an amine catalyst. Such catalysts include propylene diamine, hexamethylene diamine, etc.

The alternative prime coating material (B) poly(ethyleneimine) is also known as PEI. The use of PEI as a prime material for polymeric coatings on film substrates such as cellophane or polyolefins is well known in the art as disclosed in British Patent Nos. 766,827 & 910,875. This material is also described in U.S. Pat. No. 3,230,175. A commercially available material of this type is known as EPOMIN L50 a product of Nippon Shogubi. This material can be applied from either aqueous or organic solvent media, such as ethanol in a solution comprising about 0.1–0.6% by weight of the poly(ethyleneimine) when a mixture of A and B are employed any ratio is contemplated.

The above described prime coating materials when applied to any of the defined substrate film structures have the draw back of causing destructive blocking when such films are convolutely wound for shipment to a converter. The essence of the present invention involves the discovery that a certain class of water-dispersible polyesters ink bases can be coated onto the surface of these primers and, thereafter, the film structures can be convolutely wound without any danger of destructive blocking. In addition, it has been discovered that these polyesters can withstand extremely high (200° F.+) temperatures. Further, these polyester surfaces permit an exceptionally strong bonding to result when printed indicia or design is printed thereon. As will be shown, the multilayer structure and the printed information and/or design can withstand water temperatures of 200° F. alone or in combination with moderate abrasive action in contact with the printed surface. These polyesters have been described as linear, water-dissipatable polyesters having inherent viscosities as disclosed above and having the equimolar proportions of acid and hydroxy moieties referred to above. The polyesters comprise repeating units of components (a), (b), (c) and (d), as follows:

(a) about 90 to about 97 mole % isophthalic acid,
(b) about 3 to about 10 mole % 5-sulfoisophthalic acid,
(c) about 70 to about 85 mole % 1,4-cyclohexanedimethanol, and
(d) about 15 to about 30 mole % diethylene glycol.

Component (b) can be in the form of a sodium salt. These polyesters are described in detail in U.S. Pat. No. 5,006,598, which is incorporated herein in its entirety by reference.

EXAMPLE 1

Biaxially oriented homopolypropylene of a thickness of about 1.9 mils is corona discharge treated to about 38 dynes/cm and is one-side prime coated with the reaction product of an acidified aminoethylated vinyl polymer and an epoxy resin as described in Example 3 of U.S. Pat. No. 4,214,039. After drying in hot air to a weight of 0.05 gms/msi, the film is convolutely wound and stored at 70° F. for about 7 days. On attempting to uncoil the film it will be found to have destructive blocking and be unusable for subsequent conversions.

EXAMPLE 2

A film as in Example 1, before being rolled up is top-coated with the polyester composition described in Example 13 of U.S. Pat. No. 5,006,598. This top-coat is applied to a dry weight of just less than 0.06 gms/msi. The film is convolutely wound and stored at 70° F. for about 7 days. This film can be unrolled and re-rolled with no evidence of blocking.

EXAMPLE 3

The film of Example 2 is printed with a water-based flexographic ink known as "No. WR30007, from Environmental Inks and Coating Corp. Employing #610 Scotch Tape ® from 3M Co. as an adherence test, the printing can not be removed.

EXAMPLE 4

The printed film of Example 3 is coated with a pressure sensitive adhesive on the reverse side thereof and applied as a label to a glass container. The label and glass are submerged in 200° F. water for 10 minutes and then scraped in an attempt to remove the ink. The ink will be found to be firmly bonded to the polyester coated epoxy primed oriented polypropylene substrate. The flexographic ink will not wet corona treated polypropylene film alone and the ink can be easily lifted off by the tape.

The foregoing examples demonstrate that oriented polypropylene film can be prime coated with a prime material which leads to destructive blocking between adjacent layers. This blocking can be eliminated by top coating the prime coating with a polyester composition within the scope of U.S. Pat. No. 5,006,598. This polyester coating not only prevents the destructive blocking of the film but also provides a surface to which conventional label printing inks will aggressively adhere and even withstand the rigors of hot water applied in an agitating manner to the film in label form applied to a container surface. The same effect will be experienced if the prime coating is poly(ethyleneimine) alone or in combination with the epoxy prime coating material.

The polyesters of the present invention are fundamentally an ink without any pigment. If commercial pigments were added to polyester, they indeed could be employed as a printing ink composition. When the primed substrate is coated with the proper amount of the polyester blocking between films is prevented. This would be true whether the polyester contained an ink pigment or not. Thus, in its broadest sense the present invention overcomes the tendency of primed substrate films to block by applying a pigment or non-pigmented polyester uniformly over the primed surface. As indicated, since the polyester is fundamentally an ink without pigment and a necessary attribute of an ink is that it has good adhesion to itself, the primed and polyester coated film has excellent print characteristics. It has been found however, that the ink base polyester compositions must not be coated to an extent greater than 0.06 gms/msi. As a lower limit the polyester can be coated to that extent which effectively prevents blocking of the primed substrate film.

Although the present invention has been described with preferred embodiments, it is to be understood that modifications and variations may be resorted to without departing from the spirit and scope of this invention. Such variations and modifications are considered to be within the purview and scope of the appended claims.

What is claim is:

1. A printable film structure comprising a polymeric film substrate of a member selected from the group consisting of nylon, polyethylene terephthalate, polycarbonate, polyethylene, polypropylene, coextrudates and laminates of any two or more thereof, at least one surface having a prime coating thereon of the type which causes destructive film blocking between contacting layers of such coated films, said prime coating being a coating of a member selected from the group consisting of (A) the reaction product of acidified aminoethylated vinyl polymer and an epoxy resin (B) poly(ethyleneimine) and (C) mixtures thereof, and said prime coating having thereon an ink base of a linear water-dissipatable polyester having an inherent viscosity of about 0.1 as measured in a 60/40 parts by weight solution of phenol/tetrachloroethane at 25° C., and at a concentration of 0.5 gram of polyester in 100 ml of solvent, the polyester containing substantially equimolar proportions of acid moiety repeating units (100 mole %) to hydroxy moiety repeating units (100 mole %), the polyester comprising repeating units of components (a), (b), (c), and (d), as follows, wherein all stated mole percentages are based on the total of all acid and hydroxy moiety repeating units being equal to 200 mole %:

(a) about 90 to about 97 mole % isophthalic acid, (b) about 3 to about 10 mole % 5-sulfoisophthalic acid, (c) about 70 to about 85 mole % 1,4-cyclohexanedimethanol, and (d) about 15 to about 30 mole % diethylene glycol.

2. The structure of claim 1 wherein said substrate is polypropylene with or without the same or different skin layers of a member selected from the group consisting of polyethylene, copolymers of ethylene and butene-1, copolymers of propylene and an olefin selected from the group consisting of ethylene and butene-1, terpolymers of olefins, maleic anhydride modified polymers and mixtures thereof.

3. The structure of claim 1 wherein said substrate is polypropylene interblended with a minor proportion of a member selected from the group consisting of polyethylene, copolymers of ethylene and butene-1, copolymers of propylene and, an olefin selected from the group consisting of ethylene and butene-1, terpolymers of olefins, maleic anhydride modified polymers and mixtures thereof.

4. The structure of claim 1 having a pressure sensitive adhesive on the surface opposite to the ink base carrying surface.

* * * * *